United States Patent
Hendrix et al.

(10) Patent No.: US 11,531,178 B2
(45) Date of Patent: Dec. 20, 2022

(54) FIBER BREAKOUT ASSEMBLY

(71) Applicant: viaPhoton, Inc., Aurora, IL (US)

(72) Inventors: Walter Mark Hendrix, Richardson, TX (US); James Patrick Nolan, Yorkville, IL (US); Nathan Eric Benton, Wickenburg, AZ (US); Syed Babar Abbas, Chicago, IL (US)

(73) Assignee: ViaPhoton, Inc., Aurora, IL (US)

( * ) Notice: Subject to any disclaimer, the term of this patent is extended or adjusted under 35 U.S.C. 154(b) by 0 days.

(21) Appl. No.: 17/308,729

(22) Filed: May 5, 2021

(65) Prior Publication Data

US 2021/0349279 A1    Nov. 11, 2021

Related U.S. Application Data

(60) Provisional application No. 63/038,405, filed on Jun. 12, 2020, provisional application No. 63/021,562, filed on May 7, 2020.

(51) Int. Cl.
*G02B 6/44*    (2006.01)

(52) U.S. Cl.
CPC ........ *G02B 6/4472* (2013.01); *G02B 6/4486* (2013.01)

(58) Field of Classification Search
CPC ............................ G02B 6/4472; G02B 6/4486
See application file for complete search history.

(56) References Cited

U.S. PATENT DOCUMENTS

| | | | |
|---|---|---|---|
| 2008/0253729 A1* | 10/2008 | Gronvall | G02B 6/4472 385/137 |
| 2010/0092136 A1* | 4/2010 | Nhep | G02B 6/4472 385/136 |

* cited by examiner

*Primary Examiner* — Sung H Pak
*Assistant Examiner* — Hoang Q Tran
(74) *Attorney, Agent, or Firm* — Ferguson Braswell Fraser Kubasta PC

(57) ABSTRACT

An apparatus implements a fiber breakout assembly. The fiber breakout assembly includes a tube and a plug. The tube includes a trunk portion and a plug receiving portion. The plug includes multiple entry holes and is configured to be inserted into the plug receiving portion of the tube. A crimp post is formed as part of the tube and includes one or more crimp retention features.

20 Claims, 11 Drawing Sheets

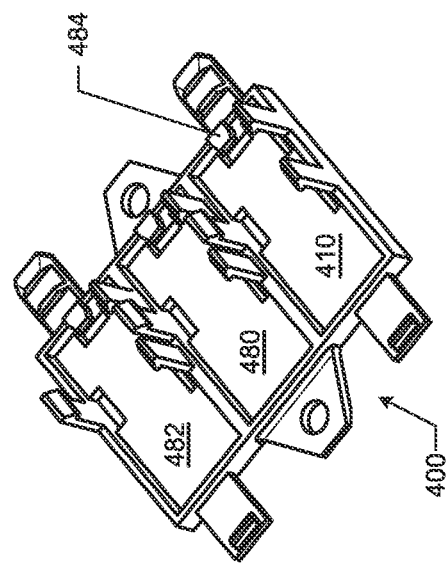
*FIGURE 4D*
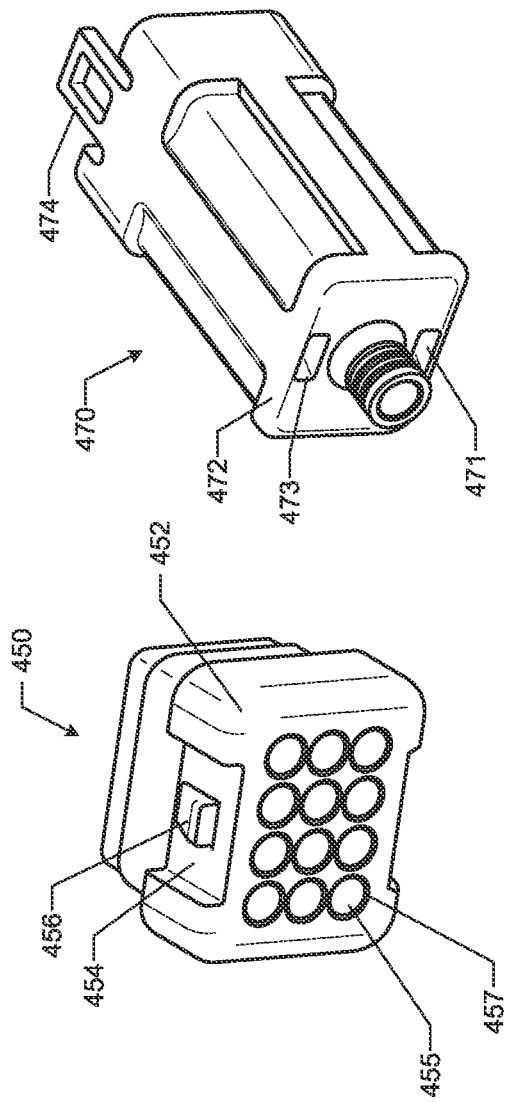
*FIGURE 4C*
*FIGURE 4B*

US 11,531,178 B2

FIBER BREAKOUT ASSEMBLY

CROSS REFERENCE TO RELATED APPLICATIONS

This application claims the benefit of U.S. Provisional Application No. 63/021,562, filed May 7, 2020, and claims the benefit of U.S. Provisional Application No. 63/038,405, filed Jun. 12, 2020, which are hereby incorporated by reference herein.

BACKGROUND

Multiple optical fibers may be contained within a cable. A challenge is to transition the optical fibers from a trunk cable with a large amount of fibers to a set of fanout cables with fewer fibers in each of the fanout cables.

SUMMARY

In general, in one or more aspects, the disclosure relates to an apparatus implementing a fiber breakout assembly. The fiber breakout assembly includes a tube and a plug. The tube includes a trunk portion and a plug receiving portion. The plug includes multiple entry holes and is configured to be inserted into the plug receiving portion of the tube. A crimp post is formed as part of the tube and includes one or more crimp retention features.

In general, in one or more aspects, the disclosure relates to a method implementing a fiber breakout assembly. A fiber breakout assembly is formed that includes a tube and a plug. The tube includes a trunk portion and a plug receiving portion. The plug includes multiple entry holes and is configured to be inserted into the plug receiving portion of the tube. A crimp post is formed as part of the tube and includes one or more crimp retention features. The tube of the fiber breakout assembly is attached to a trunk cable. The plug of the fiber breakout assembly is attached to multiple fanout cables.

In general, in one or more aspects, the disclosure relates to an optical fiber cable including a trunk cable, multiple fanout cables, and a fiber breakout assembly. The fiber breakout assembly connects between the trunk cable and the fanout cables. The fiber breakout assembly includes a tube and a plug. The tube includes a trunk portion and a plug receiving portion. The plug includes multiple entry holes and is configured to be inserted into the plug receiving portion of the tube. A crimp post is formed as part of the tube and includes one or more crimp retention features.

Other aspects of the invention will be apparent from the following description and the appended claims.

BRIEF DESCRIPTION OF DRAWINGS

FIG. 4B shows a plug of a fiber breakout assembly in accordance with disclosed embodiments.

FIG. 4C shows a tube of a fiber breakout assembly in accordance with disclosed embodiments.

FIG. 4D shows a carrier for fiber breakout assemblies in accordance with disclosed embodiments.

DETAILED DESCRIPTION

Figure 1A:
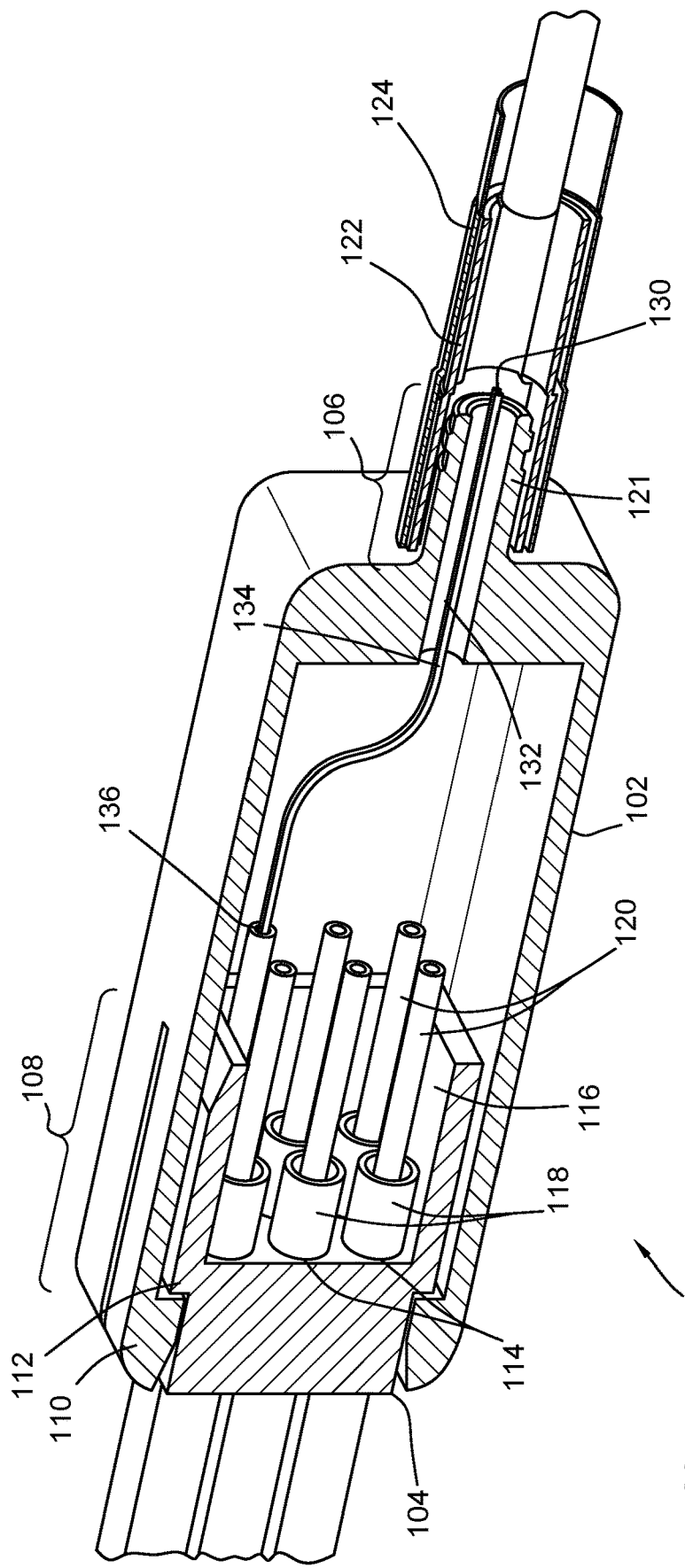
FIG. 1A shows a fiber breakout assembly in accordance with disclosed embodiments.

Specific embodiments will now be described in detail with reference to the accompanying figure. Like elements in the figure are denoted by like reference numerals for consistency.

In the following detailed description, numerous specific details are set forth in order to provide a more thorough understanding of the disclosure. However, it will be apparent to one of ordinary skill in the art that the disclosed embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the provide a fiber breakout assembly. The fiber breakout assembly transitions (i.e., breaks out) a set of optical fibers from a trunk cable to a set of fanout cables.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of optical fiber cables and assemblies. The various elements, systems, and components shown in the figures may be omitted, repeated, combined, and/or altered as shown from the figures. Accordingly, the scope of the present disclosure should not be considered limited to the specific arrangements shown in the figures.

Figure 1B:
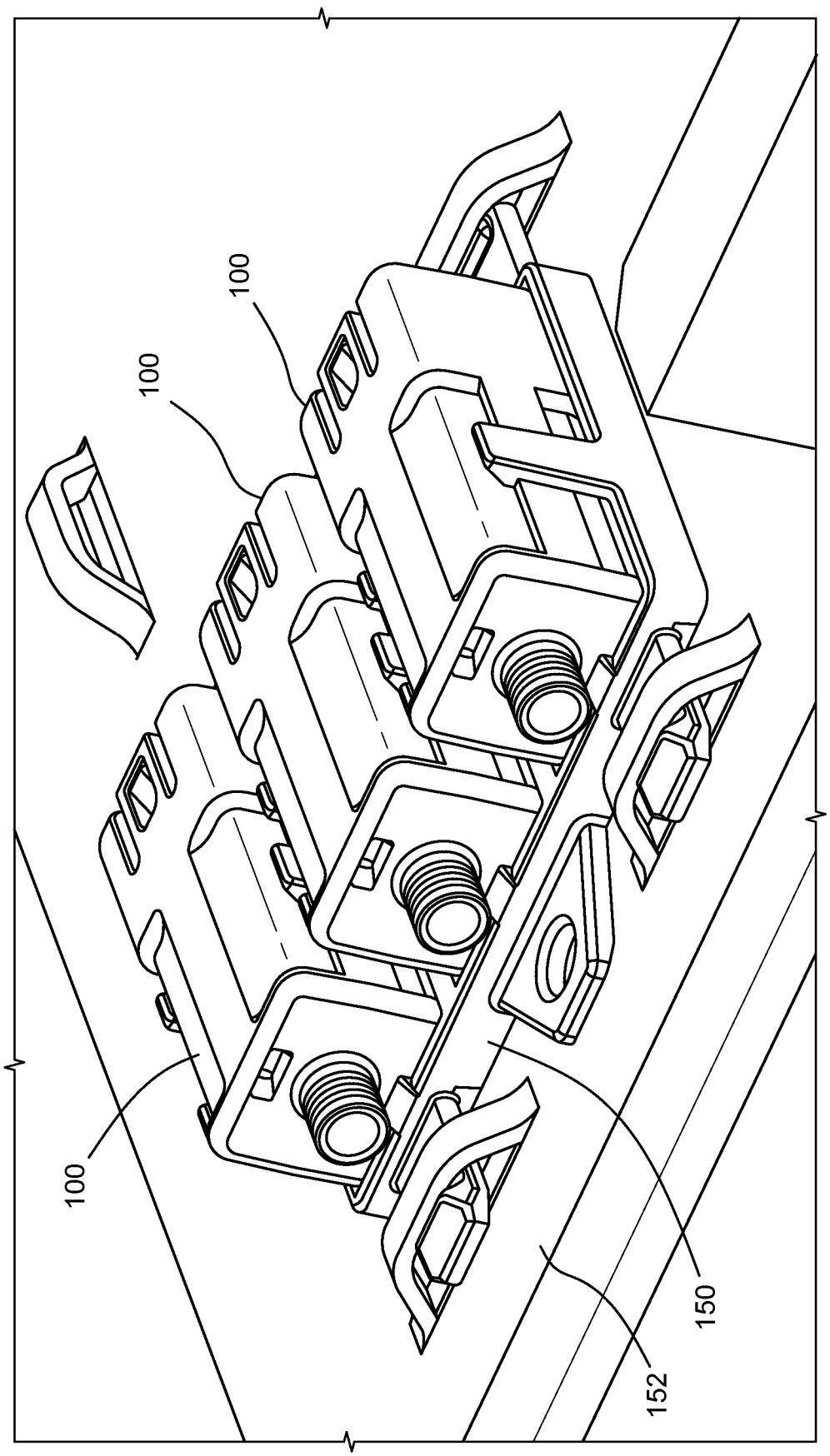
FIG. 1B shows fiber breakout assemblies in a carrier on a panel in accordance with disclosed embodiments.
Figure 1C:
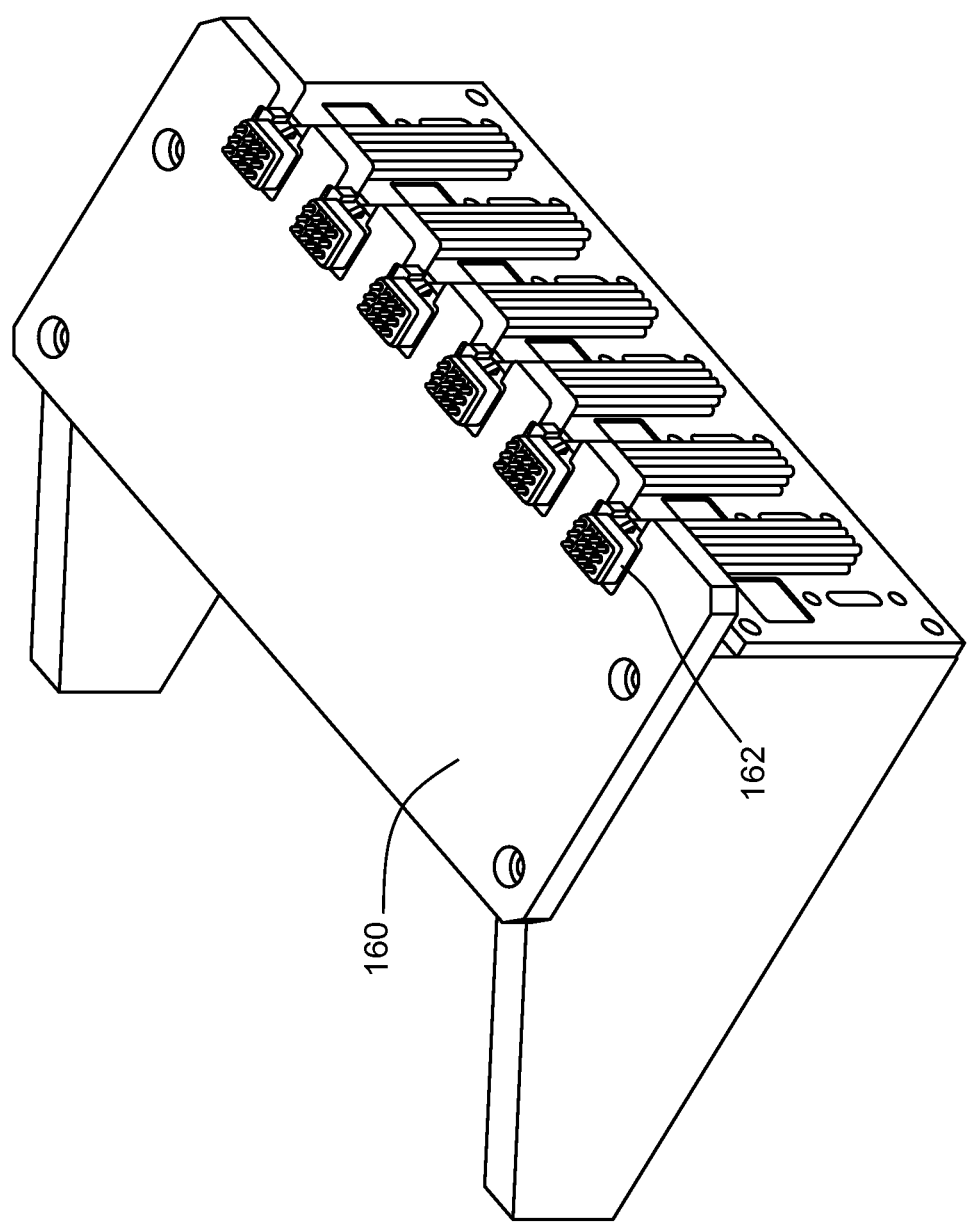
FIG. 1C shows a fixture with plugs of fiber breakout assemblies in accordance with disclosed embodiments.

FIG. 1A shows a diagram of one embodiment of a fiber breakout assembly in accordance with the disclosure. FIG. 1B shows a diagram of one embodiment of a carrier in accordance with the disclosure. FIG. 1C shows a diagram of one embodiment of an assembly fixture in accordance with the disclosure. The embodiments of FIG. 1A, FIG. 1B, and FIG. 1C may be combined and may include or be included within the features and embodiments described in the other figures of the application. The various elements, systems, and components shown in FIG. 1A, FIG. 1B, and FIG. 1C may be omitted, repeated, combined, and/or altered as shown from FIG. 1A, FIG. 1B, and FIG. 1C. Accordingly, the scope of the present disclosure should not be considered limited to the specific arrangements shown in FIG. 1A, FIG. 1B, and FIG. 1C.

Turning to FIG. 1A, the fiber breakout assembly (100) includes the tube (102) and the plug (104). The tube (102) includes a trunk portion (106) and a plug receiving portion (108). The trunk portion includes the integrated crimp post (121), the crimp ring (122), and the crimp jacket (124). The tube (102) does not include threads for fastening, which reduces or eliminates the amount of rotation and fiber strain to assemble the fiber breakout assembly.

The plug (104) includes multiple entry holes (114) and is shaped to be inserted into the plug receiving portion (108) of the tube (102). The cavity (116) within the plug (104) may be filled with an adhesive (e.g., epoxy) to secure the fiber jackets (118) and interior fiber tubes (120) within the cavity (116) and in the entry holes (114). The entry holes (114) may be arranged in a rectangular manner. The rectangular placement of the entry holes (114) increases the density of the fibers (i.e., the number of fibers within a given cross sectional area) as compared to a circular placement of holes.

The tube (102) includes an integrated tube fastening member (110) and the plug (104) includes an integrated plug fastening member (112). The integrated plug fastening member (112) is shaped to interconnect with the integrated tube fastening member (110) to secure the plug (104) and the tube (102) with each other.

Multiple optical fibers are incorporated with the fiber breakout assembly (100). For example, the optical fibers (130) include the trunk section (132) in the trunk portion (106), the breakout section (134) in the fiber breakout assembly (100), and the fanout section (136) disposed through an entry hole of the plurality of entry holes.

The fiber breakout assembly (100) is suitable for a wide range of fiber counts. As an example, the counts may be from 12 to 1728 fibers. For 1728 fibers, 6 fiber breakout assemblies may be fitted to two carriers, which are fitted to a fiber panel. FIG. 1B shows three fiber breakout assemblies fitted to one carrier fitted to a fiber panel.

Turning to FIG. 1B, the fiber breakout assemblies (100) may be fitted to the carrier (150), which is fitted to the fiber panel (152). The carrier (150) provides strain relief to the cable. The fiber breakout assemblies are configured with a snap fit configuration that does not require additional fasteners for being secured to the carrier (150). The carrier (150) is configured with a snap fit configuration that does not require additional fasteners for being secured to the fiber panel (152).

Turning to FIG. 1C, the assembly fixture (160) may hold multiple plugs (162) in an upright manner and for the plugs (162) to receive adhesive from an automated dispenser.

Figure 2A:
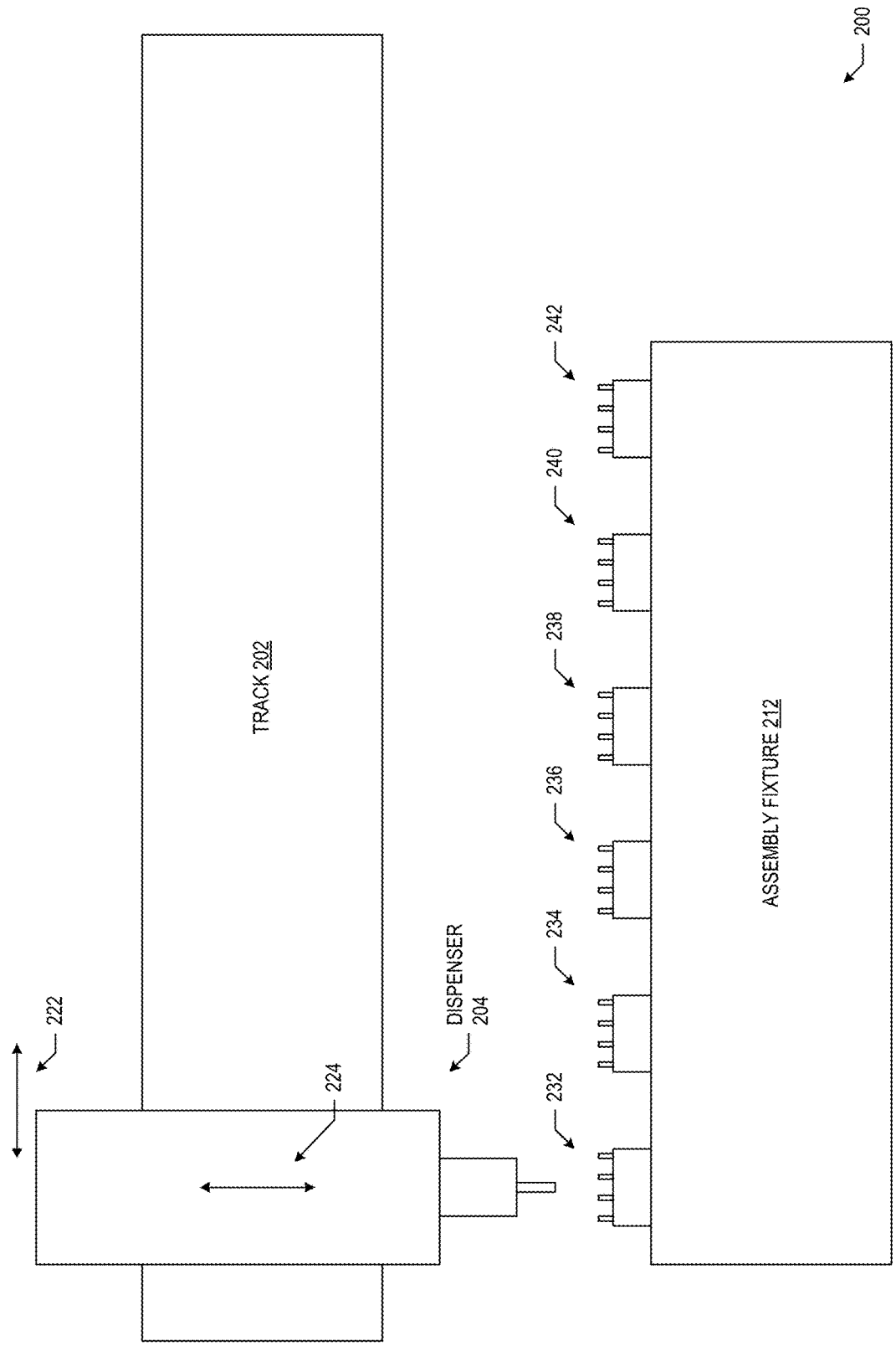
FIG. 2A shows a dispenser system in accordance with disclosed embodiments.

Turning to FIG. 2A, the dispenser system (200) dispenses epoxy into the plugs (232), (234), (236), (238), (240), and (242), which are held in place by the assembly fixture (212). The dispenser system (200) includes the track (202) and the dispenser (204).

The track (202) guides movement of the dispenser (204) along the axis (222). The dispenser (204) is movably attached to the track (202) to also move along the axis (224), which may be orthogonal to the axis (222).

Figure 2B:
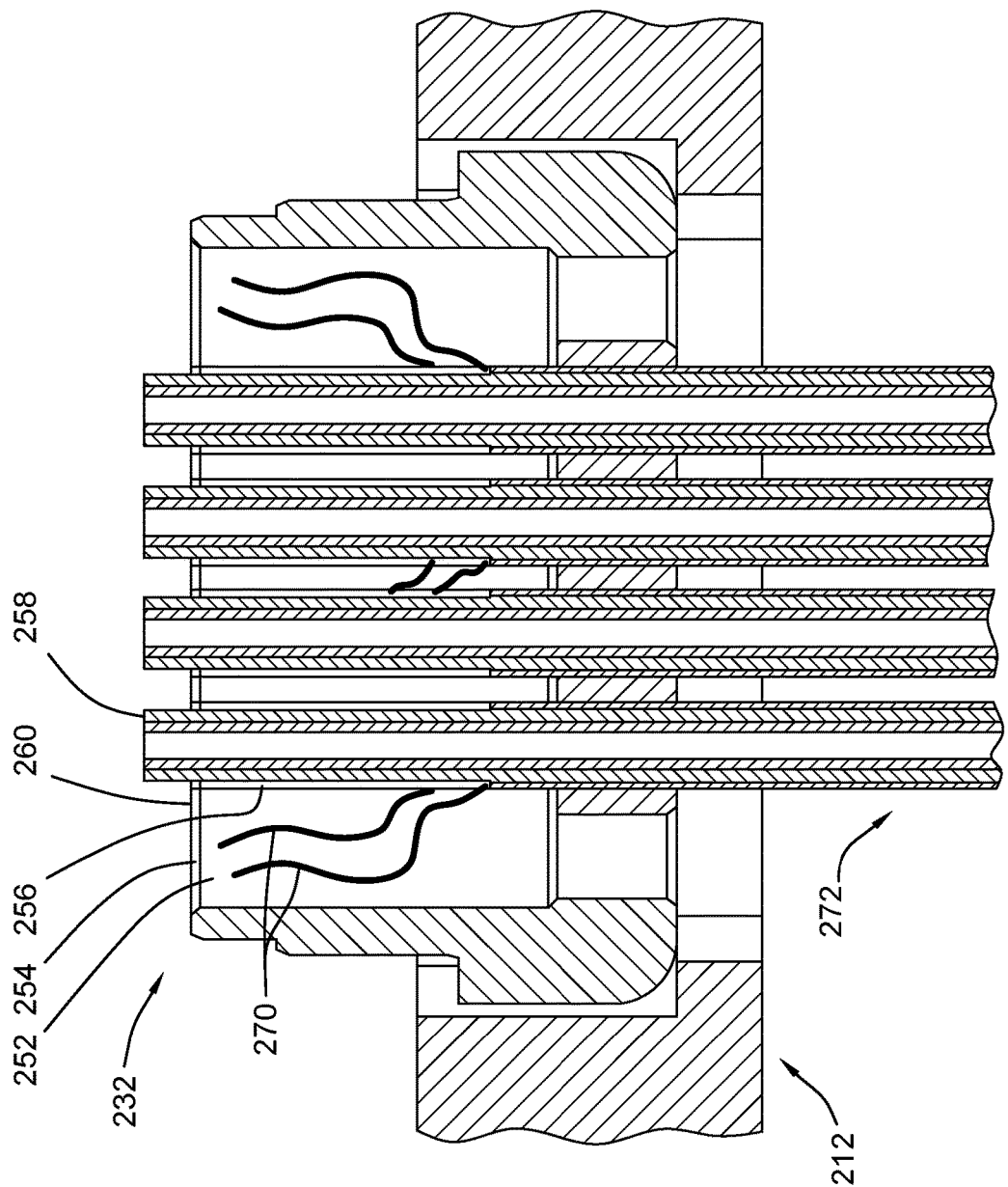
FIG. 2B shows plug cross section.

Turning to FIG. 2B, which shows a cross section of the plug (232) in the assembly fixture (212), the plug (232) is fixed in place in the assembly fixture (212). The epoxy (252) fills in the cavity (254) through with the jacket (256) and the interior fiber tube (258) protrude. In one embodiment, the interior fiber tube (258) extends above the end (260) of the plug (232) by about 1 millimeter.

The shielding fibers (270), which surround the jacket (256) in the fanout cable (272), extend into the epoxy (252). In one embodiment, the shielding fibers (270) are aramid fibers.

Figure 3A:
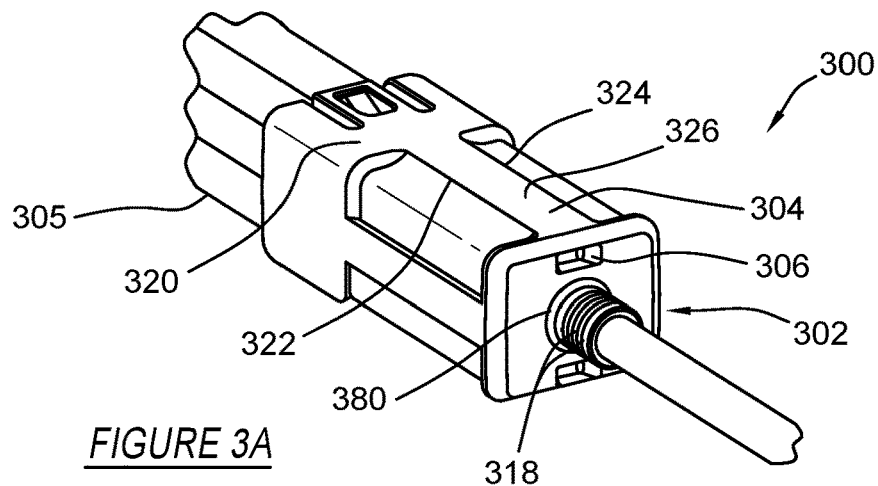
FIG. 3A, FIG. 3B, and FIG. 3C show a fiber breakout assembly in accordance with disclosed embodiments.

Turning to FIG. 3A, the fiber breakout assembly (300) includes the integrated crimp post (302). The integrated crimp post (302) includes the crimp features (318) and the base (380). In one embodiment, the integrated crimp post (302) is made from the same mold used to cast the tube (304) of the fiber breakout assembly (300). In the embodiment of FIG. 3A, four fanout cables (305) extend out from twelve entry holes (not shown) of the fiber breakout assembly (300). In one embodiment, the unused entry holes may be plugged with epoxy.

The tube (304) includes the hole (306). The hole (306) is shaped to receive a fastening member, which may be integrated as part of a carrier for the fiber breakout assembly (300). Placement of the hole (306) on the trunk cable side of the fiber breakout assembly (300), with an appropriately shaped carrier as shown in FIG. 1B, causes the trunk cable (or tube) side of the fiber breakout assembly (300) to be placed into the carrier prior to placement of the fanout cable (or plug) side of the fiber breakout assembly (300).

The tube (304) is rectangularly shaped with four faces, including the face (320). The face (320) of the tube (304) includes the longitudinal ridges (322) and (324) and includes the pattern (326). The longitudinal ridges (322) and (324) are shaped to fit fastening members of carriers for the fiber breakout assembly (300). The pattern (326) is debossed (or recessed) into the tube (304). In additional embodiments, the pattern (326) may be embossed, debossed, printed, or a combination thereof.

Figure 3B:
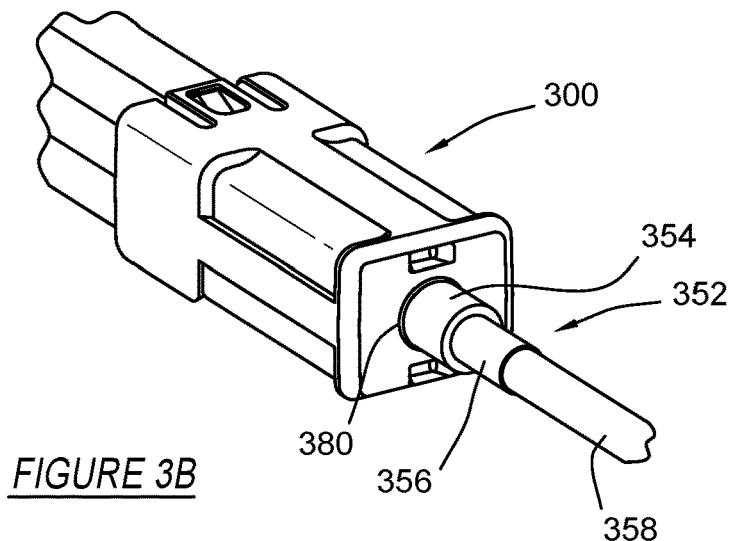

Turning to FIG. 3B, the crimp sleeve (352) is added. In one embodiment, the crimp sleeve (352) is made of metal that is press fitted to the integrated crimp post (302) (of FIG. 3A) contacting the crimp features (318) (of FIG. 3A) of the integrated crimp post (302) (of FIG. 3A). In one embodiment, the crimp sleeve (352) does not cover the base (380). The crimp sleeve (352) includes the crimp section (354) and the cable section (356). The crimp section (354) is fitted to the integrated crimp post (302) (of FIG. 3A). The cable section (356) is fitted to the trunk cable (358) extending from the fiber breakout assembly (300).

Figure 3C:
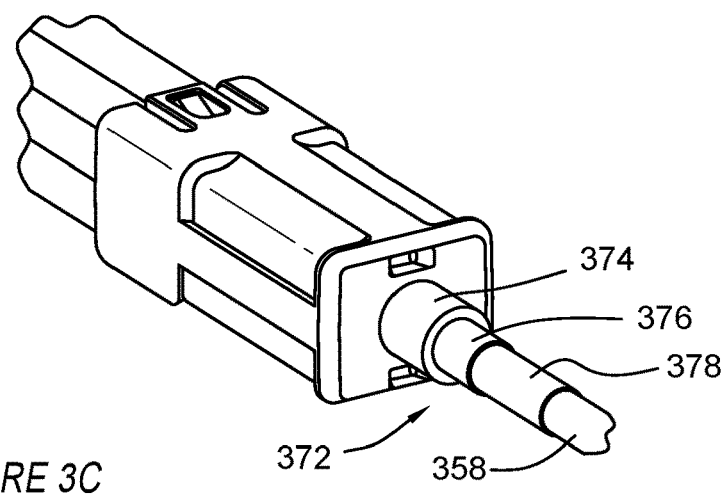

Turning to FIG. 3C, the covering (372) covers the crimp sleeve (352) (of FIG. 3B). The crimp sleeve includes sections for the post cover (374), the intermediate cover (376), and the cable cover (378). The post cover (374) covers the crimp section (354) (of FIG. 3B) and the base (380) (of FIG. 3B). The intermediate cover (376) covers the cable section (356) (of FIG. 3B) of the crimp sleeve (352) (of FIG. 3B). The cable cover (378) covers a portion of the cable (358).

Figure 4A:
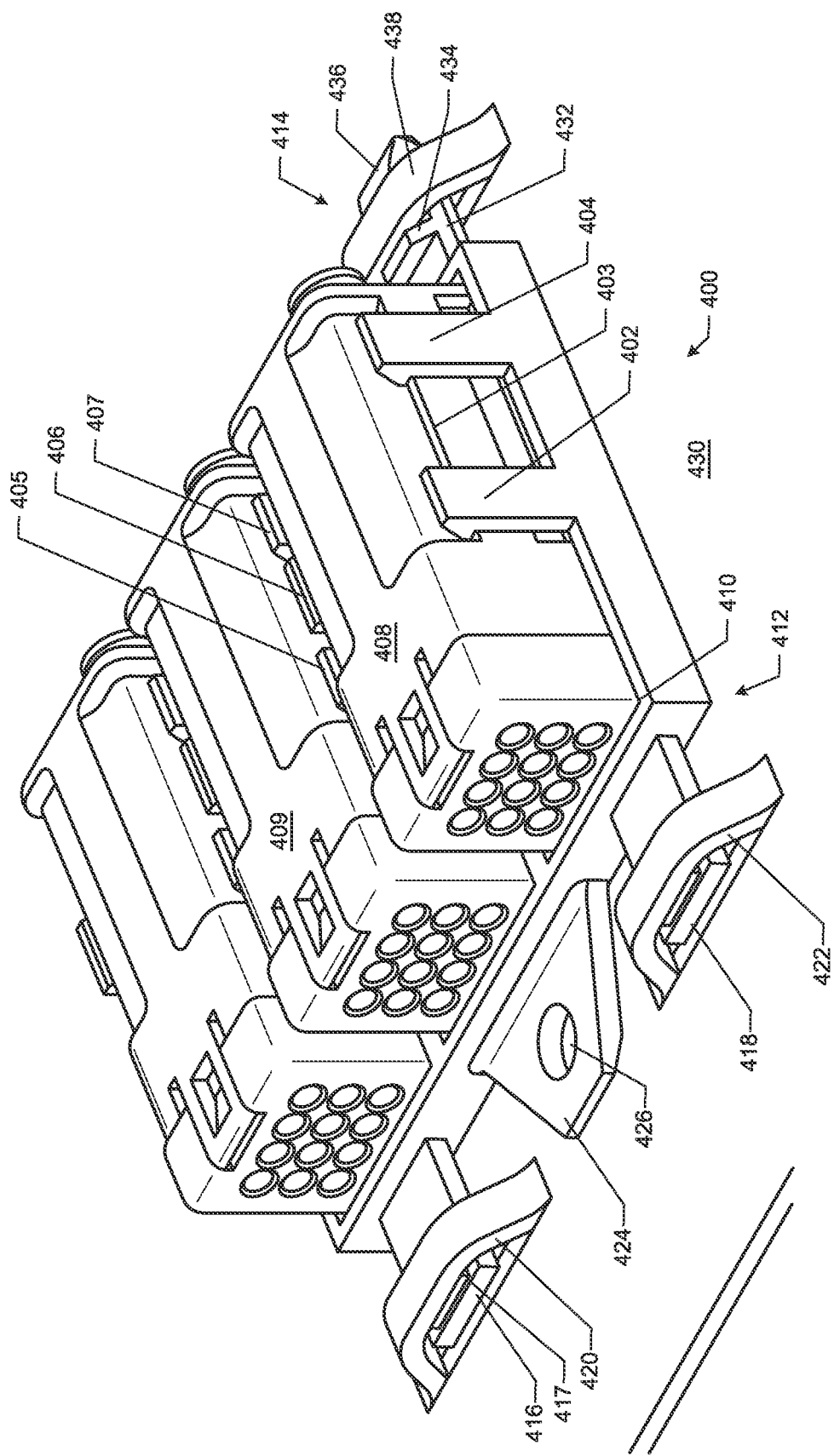
FIG. 4A shows a carrier with fiber breakout assemblies in accordance with disclosed embodiments.

Turning to FIG. 4A, the carrier (400) is secured to the panel (430). The fastening members (402), (404), and (406) of the carrier (400) secure the fiber breakout assembly (408) in the cavity (410) of the carrier (400). The fastening member (406) is between the fastening members (405) and (407) with enough clearance to allow the fastening member (406) to snap fit and lock to the fiber breakout assembly (408) and allow the fastening members (405) and (407) to snap fit and lock to the fiber breakout assembly (409). The fastening members (402) and (404) secure to an upper longitudinal ridge (403) of the fiber breakout assembly (408).

The carrier (400) includes the fanout (or plug) side (412) and the trunk (or tube) side (414). The tabs (416) and (418), of the fanout side (412), slide underneath the support members (420) and (422) (which are raised from the panel (430)), respectively. The fanout side (412) includes the flange (424) with the hole (426), which may be used in conjunction with a fastener (e.g., a screw) to secure the carrier (400) to the panel (430). The tab (416) includes the raised portion (417). In one embodiment, the raised portion (417) pushes into the support member (420) to secure the carrier (400) to the panel (430).

The trunk side (414) includes the tab (432) with the stop (434) and the wedge (436). The stop (434) prevents translational movement along the axis between the support members (422) and (438). The wedge (436) provides for a snap fit of the carrier (400) to the panel (430) when sliding the carrier (400) along the axis between the support members (422) and (438).

Turning to FIG. 4B, the plug (450) (from the fiber breakout assembly (408) of FIG. 4A) includes the rounded edge (452). The plug (450) includes the recess (454) for the fastening member (456), which is configured to fit with the fastening member (474) of the tube (470) of FIG. 4C. The plug (450) has a rectangular cross section with multiple entry holes, including the entry hole (455). The entry hole (455) includes the rounded edge (457).

Turning to FIG. 4C, the tube (470) (from the fiber breakout assembly (408) of FIG. 4A) includes the rounded edge (472) and the fastening members fastening members (471) and (473). The fastening members (471) and (473) may each be configured to fit the fastening member (484) of the carrier (400) of FIG. 4D. The tube (470) includes the fastening member (474) configured to snap to the fastening member (456) (of FIG. 4B).

Turning to FIG. 4D, the carrier (400) includes the cavities, (410), (480), and (482). The fastening member (484) fits to either the fastening member (471) or (473) (of FIG. 4C).

Figure 4E:
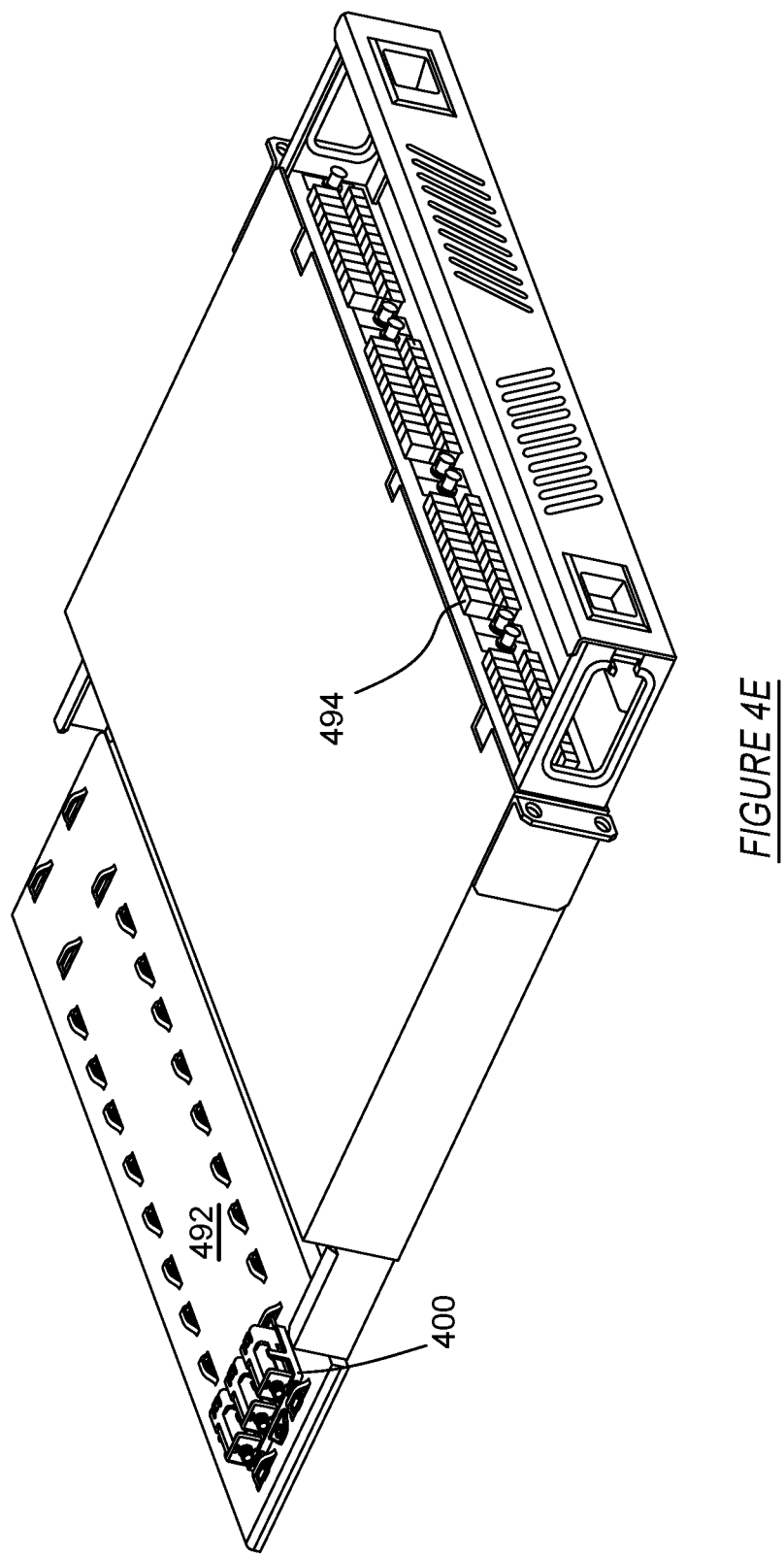
FIG. 4E shows a panel with fiber breakout assemblies in a carrier in accordance with disclosed embodiments.

Turning to FIG. 4E, the carrier (400) is fitted to the panel (492). The panel (492) contains multiple female optical fiber connectors (494).

Figure 5:
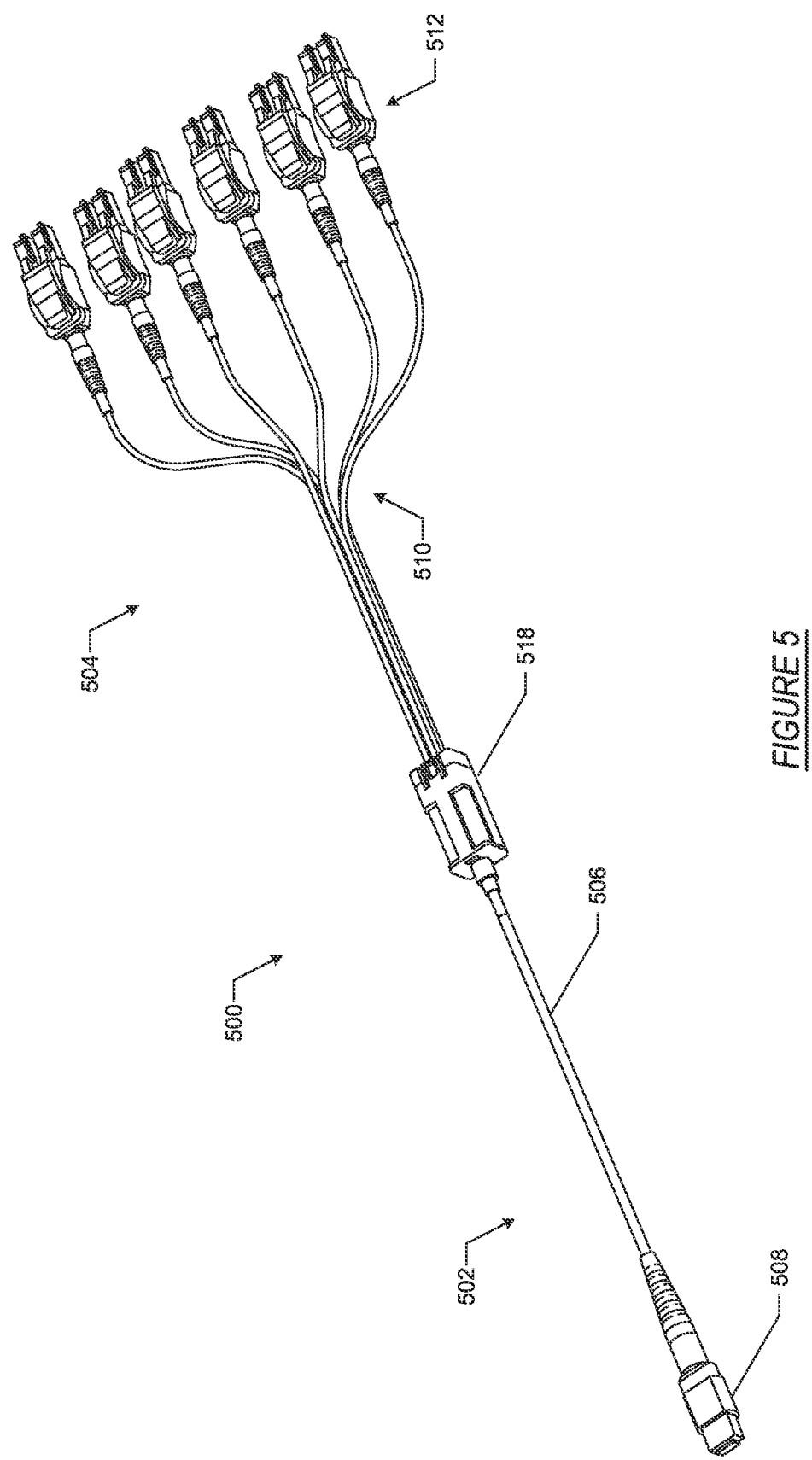
FIG. 5 shows a cable that includes a fiber breakout assembly in accordance with disclosed embodiments.

Turning to FIG. 5, the cable assembly (500) includes the trunk portion (502) and the fanout portion (504). The trunk portion (502) includes the trunk cable (506) and the trunk connector (508). The fanout portion (504) includes the multiple fanout cables (510) with the multiple fanout connectors (512). The fiber breakout assembly (518) breaks out the optical fibers from the trunk cable (506) to the optical fibers in the fanout cables (510). In one embodiment, the trunk cable (506) may range from about 5 feet to about 300 feet. In one embodiment, the fanout cables (510) may be about 16 inches and range from about 6 to 36 inches.

Figure 6:
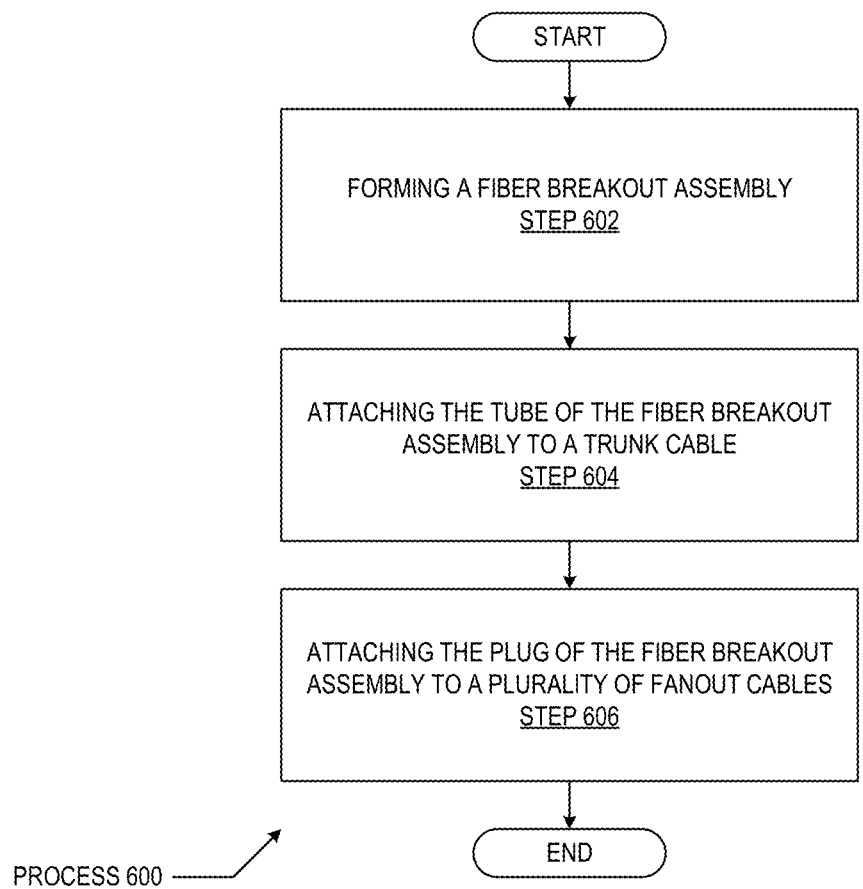
FIG. 6 shows a flowchart of a method to form a cable with a fiber breakout assembly in accordance with disclosed embodiments.

FIG. 6 shows a flowchart of a method of manufacturing an optical cable with a fiber breakout assembly. The embodiment of FIG. 6 may be combined and may include or be included within the features and embodiments described in the other figures of the application. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 6, the process (600) forms an optical fiber cable. At Step 602, a fiber breakout assembly is formed. In one embodiment, the fiber breakout assembly is formed as a single injection molded piece.

At Step 604, a tube of the fiber breakout assembly is attached to a trunk cable. In one embodiment, the trunk cable includes a connector on a distal end and the fiber breakout assembly is connected to the trunk cable at a proximal end. In one embodiment, the tube is attached to the trunk cable after about two to three feet of the trunk cable is stripped.

At Step 606, a plug of the fiber breakout assembly is attached to a plurality of fanout cables. In one embodiment, the fanout cables each includes a connector on distal ends of the fanout cables and the fiber breakout assembly is connected to the fanout cables at proximal ends of the fanout cables.

While the disclosure is described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. An apparatus comprising:
a fiber breakout assembly comprising a tube and a plug;
the tube comprising a trunk portion and a plug receiving portion;
the plug comprising a plurality of entry holes, the plug configured to be inserted into the plug receiving portion of the tube;
a crimp post formed as part of the tube and comprising one or more crimp retention features;
the tube formed as a single piece;
the tube comprising a first fastening member configured to snap to a second fastening member of the plug;
the tube comprising a longitudinal ridge configured to be secured to a plurality of third fastening members of a carrier configured to hold a plurality of tubes, the plurality of tubes comprising the tube; and
a cavity within the plug filled with an adhesive to secure fiber jackets and interior fiber tubes within the cavity and to the plurality of entry holes of the plug.

2. The apparatus of claim 1, further comprising:
the tube further comprising an integrated tube fastening member; and
the plug further comprising an integrated plug fastening member, wherein the integrated plug fastening member is shaped to interconnect with the integrated tube fastening member to secure the plug and the tube.

3. The apparatus of claim 1, further comprising:
at least one optical fiber comprising a trunk section disposed through the trunk portion, a breakout section within the fiber breakout assembly, and a fanout section disposed through an entry hole of the plurality of entry holes.

4. The apparatus of claim 1, further comprising:
the plug having a rectangular cross section comprising the plurality of entry holes.

5. The apparatus of claim 1, further comprising:
the plug having a rounded edge.

6. The apparatus of claim 1, further comprising:
an entry hole, of the plurality of entry holes, comprising an optical fiber within a fanout tube within a jacket.

7. The apparatus of claim 1, further comprising:
an entry hole, of the plurality of entry holes, comprising a rounded edge.

8. The apparatus of claim 1, further comprising:
the tube comprising a plurality of longitudinal fastening members configured to snap fit with a carrier.

9. The apparatus of claim 1, further comprising:
a recess in a rounded edge of the plug, the recess comprising an integrated plug fastening member, of the plug, configured to fasten to an integrated tube fastening member, of the tube.

10. The apparatus of claim 1, further comprising:
a plurality of longitudinal ridges, including the longitudinal ridge, formed in the tube and configured to fit with the plurality of third fastening members of the carrier.

11. A method comprising:
forming a fiber breakout assembly, wherein the fiber breakout assembly comprises: a tube and a plug,
   the tube comprising a trunk portion and a plug receiving portion,
   the plug comprising a plurality of entry holes, the plug configured to be inserted into the plug receiving portion of the tube,
   a crimp post formed as part of the tube and comprising one or more crimp retention features,
   the tube formed as a single piece,
   the tube comprising a first fastening member configured to snap to a second fastening member of the plug,
   the tube comprising a longitudinal ridge configured to be secured to a plurality of third fastening members of a carrier configured to hold a plurality of tubes, the plurality of tubes comprising the tube, and
   a cavity within the plug filled with an adhesive to secure fiber jackets and interior fiber tubes within the cavity and to the plurality of entry holes of the plug;
attaching the tube of the fiber breakout assembly to a trunk cable; and
attaching the plug of the fiber breakout assembly to a plurality of fanout cables.

12. The method of claim 11, wherein:
the tube further comprises an integrated tube fastening member; and
the plug further comprising an integrated plug fastening member, wherein the integrated plug fastening member is shaped to interconnect with the integrated tube fastening member to secure the plug and the tube.

13. The method of claim 11, wherein:
at least one optical fiber comprising a trunk section disposed through the trunk portion, a breakout section within the fiber breakout assembly, and a fanout section disposed through an entry hole of the plurality of entry holes.

14. The method of claim 11, wherein:
the plug having a rectangular cross section comprising the plurality of entry holes.

15. The method of claim 11, wherein:
the plug having a rounded edge.

16. The method of claim 11, wherein:
an entry hole, of the plurality of entry holes, comprising an optical fiber within a fanout tube within a jacket.

17. The method of claim 11, wherein:
an entry hole, of the plurality of entry holes, comprising a rounded edge.

18. The method of claim 11, wherein:
the tube comprising a plurality of longitudinal fastening members configured to a snap fit with a carrier.

19. The method of claim 11, wherein:
a recess in a rounded edge of the plug, the recess comprising an integrated plug fastening member, of the plug, configured to fasten to an integrated tube fastening member, of the tube.

20. An optical fiber cable comprising:
a trunk cable;
a plurality of fanout cables; and
a fiber breakout assembly connecting between the trunk cable and the plurality of fanout cables, wherein the fiber breakout assembly comprises:
   a tube and a plug,
   the tube comprising a trunk portion and a plug receiving portion,
   the plug comprising a plurality of entry holes, the plug configured to be inserted into the plug receiving portion of the tube,
   a crimp post formed as part of the tube and comprising one or more crimp retention features,
   the tube formed as a single piece,
   the tube comprising a first fastening member configured to snap to a second fastening member of the plug,
   the tube comprising a longitudinal ridge configured to be secured to a plurality of third fastening members of a carrier configured to hold a plurality of tubes, the plurality of tubes comprising the tube, and
   a cavity within the plug filled with an adhesive to secure fiber jackets and interior fiber tubes within the cavity and to the plurality of entry holes of the plug.

* * * * *